(12) United States Patent
Oltmann et al.

(10) Patent No.: US 11,608,080 B2
(45) Date of Patent: Mar. 21, 2023

(54) METHOD FOR REGULATING THE MOVEMENT OF A VEHICLE IN AN AUTOMATED DRIVING OPERATION AND DEVICE FOR CARRYING OUT THE METHOD

(71) Applicant: DAIMLER AG, Stuttgart (DE)

(72) Inventors: Volker Oltmann, Calw (DE); Michael Decker, Böblingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 397 days.

(21) Appl. No.: 16/956,082

(22) PCT Filed: Dec. 13, 2018

(86) PCT No.: PCT/EP2018/084836
§ 371 (c)(1),
(2) Date: Jan. 4, 2021

(87) PCT Pub. No.: WO2019/121344
PCT Pub. Date: Jun. 27, 2019

(65) Prior Publication Data
US 2021/0107520 A1    Apr. 15, 2021

(30) Foreign Application Priority Data
Dec. 20, 2017   (DE) .................... 10 2017 011 808.6

(51) Int. Cl.
*B60W 60/00*   (2020.01)
*B60W 30/18*   (2012.01)
*G01C 21/34*   (2006.01)

(52) U.S. Cl.
CPC ...... *B60W 60/0015* (2020.02); *B60W 30/181* (2013.01); *B60W 30/18163* (2013.01);
(Continued)

(58) Field of Classification Search
CPC ........... B60W 60/0015; B60W 30/181; B60W 30/18163; B60W 60/0053;
(Continued)

(56) References Cited

U.S. PATENT DOCUMENTS 9,663,104 B2   5/2017 Hauler et al.
11,422,554 B2   8/2022 Shashua et al.
(Continued)

FOREIGN PATENT DOCUMENTS

CN   101403593 A   4/2009
CN   105358396 A   2/2016
(Continued)

OTHER PUBLICATIONS

Examination Report created on Sep. 13, 2018 in related/corresponding DE Application No. 10 2017 011 808.6.
(Continued)

*Primary Examiner* — Khoi H Tran
*Assistant Examiner* — Tristan J Greiner
(74) *Attorney, Agent, or Firm* — Patent Portfolio Builders PLLC (57) ABSTRACT

Vehicle movement in an automatic driving operation is regulated in an automatic driving operation, which is switchable between a regular operating mode and an emergency operating mode when a functional impairment of a main control device is established. In the regular operating mode, the regular desired trajectory, the emergency operation desired trajectory, and the lane course of a driving lane driven along by the vehicle are continuously determined in a coordinate system, fixed to the vehicle, of the main control device. The determined emergency operation desired trajectory and the determined lane course are supplied to the ancillary control device and stored there. In the emergency operating mode, the lane course of the driving lane driven (Continued)

along by the vehicle is determined in a coordinate system, fixed to the vehicle, of the ancillary control device. In the emergency operating mode, based on the lane course stored in the ancillary control device and the lane course stored in the ancillary control device, an angle error between the coordinate systems of the main control device and the ancillary control device is determined and its influence on the regulation carried out by the ancillary control device is compensated for.

10 Claims, 3 Drawing Sheets

(52) U.S. Cl.
CPC ..... *B60W 60/0053* (2020.02); *G01C 21/3461* (2013.01); *B60W 2520/06* (2013.01); *B60W 2552/53* (2020.02)

(58) Field of Classification Search
CPC ......... B60W 2520/06; B60W 2552/53; B60W 50/00186; G01C 21/3461
See application file for complete search history.

(56) References Cited

U.S. PATENT DOCUMENTS

| | | | | |
|---|---|---|---|---|
| 2007/0198146 A1* | 8/2007 | Ikeda | ................ | H04N 7/18 701/23 |
| 2016/0368491 A1* | 12/2016 | Hauler | ............ | B60W 60/00186 |
| 2017/0010618 A1* | 1/2017 | Shashua | ............. | G01C 21/3896 |
| 2017/0212512 A1* | 7/2017 | Schmid | ................. | B60K 28/10 |
| 2019/0138000 A1* | 5/2019 | Hammond | ........... | G05D 1/0212 |
| 2020/0057447 A1* | 2/2020 | Kato | ..................... | B60W 30/16 |

FOREIGN PATENT DOCUMENTS

| | | |
|---|---|---|
| CN | 106020203 A | 10/2016 |
| CN | 107380161 A | 11/2017 |
| CN | 107438754 A | 12/2017 |
| DE | 102013003216 A1 | 9/2013 |
| DE | 102013213171 A1 | 1/2015 |
| DE | 102015003124 A1 | 9/2016 |
| DE | 102016006137 A1 | 2/2017 |
| EP | 2390862 A2 | 11/2011 |

OTHER PUBLICATIONS

International Search Report dated Apr. 23, 2019 in related/corresponding International Application No. PCT/EP2018/084836.
Written Opinion dated Apr. 23, 2019 in related/corresponding International Application No. PCT/EP2018/084836.
Office Action dated Oct. 19, 2022 in related/corresponding CN Application No. 201880081235.4.

* cited by examiner

METHOD FOR REGULATING THE MOVEMENT OF A VEHICLE IN AN AUTOMATED DRIVING OPERATION AND DEVICE FOR CARRYING OUT THE METHOD

BACKGROUND AND SUMMARY OF THE INVENTION

Exemplary embodiments of the invention relate to a method for regulating the movement of a vehicle in an automatic driving operation, in particular in a highly automatic driving operation and to a device for carrying out the method.

DE 10 2013 213 171 A1 describes a method for operating a vehicle in an automatic driving operation, wherein, during the automatic driving operation, two desired trajectories for two different control devices of the vehicle are continuously determined. One of the two desired trajectories, referred to below as the regular desired trajectory, describes a planned path and a planned speed profile on a stretch of road lying immediately ahead, on which the vehicle is to be guided by taking into consideration a current vehicle surrounding situation in relation to a planned target position. The regular desired trajectory is allocated to the first of the two control devices, which, on the basis thereof, generates actuating signals for subordinate actuator devices acting on the longitudinal and transverse dynamic system of the vehicle in such a way that the vehicle is guided according to the requirements of the regular desired trajectory. The other of the two desired trajectories, referred to below as emergency operation desired trajectory, describes a path, on which the vehicle is to be securely held taking the surrounding situation into consideration when the vehicle can no longer be operated automatically. The emergency operation desired trajectory is allocated to the second of the two control devices, which, on the basis thereof, generates actuating signals for the subordinate actuator devices in such a way that the vehicle is braked to a standstill according to the requirements of the emergency operation desired trajectory.

DE 102015003124 A1 discloses a method for operating a vehicle in an automatic driving operation in which, in a regular operating mode, i.e. during a normal function of the automatic driving operation, in which the automatic driving operation functions faultlessly, a regular desired trajectory is continuously ascertained by a main control device taking into consideration a current vehicle surrounding situation, the desired trajectory predetermining, for a stretch of road lying immediately ahead, on what path and with what speed profile the vehicle is to be guided during the automatic driving operation. Furthermore, during the automatic driving operation, in anticipation of an error function of the automatic driving operation emerging, an emergency operation desired trajectory is continuously ascertained and stored in an ancillary control device. Here, the emergency operation desired trajectory predetermines a path on which the vehicle is to be braked to a standstill if the established error function emerges. If it is established during the automatic driving operation that an error function of the automatic driving operation is present, the vehicle is braked to a standstill according to the requirements by the emergency operation desired trajectory with the ancillary control device by a trajectory regulation in a longitudinally and transversely regulated manner.

Problems emerge here when the desired trajectories are defined in a coordinate system fixed to the vehicle and moved with the vehicle. In this case, the coordinate system that is used by the main control device to determine the emergency operation desired trajectory, must be congruent with the coordinate system that is used by the ancillary control device for carrying out the trajectory regulation, when the vehicle is to be guided as desired along the emergency operation desired trajectory. This requirement for congruent coordinate systems is not fulfilled because of different latencies into the input signals of the control devices and because of different process chains into the control device. The coordinate system of the main control device is thus rotated in relation to the coordinate system of the ancillary control device. The vehicle is thus repositioned on a trajectory, which is rotated in comparison to the emergency operation desired trajectory determined in the regular operating mode correspondingly to the rotation of the coordinate systems.

Exemplary embodiments are directed to a method and a device of the kind mentioned above that provides a more exact driving of the vehicle in the emergency operation mode.

In the method according to the invention for regulating the movement of a vehicle in an automatic driving operation, in particular in a highly automatic driving operation, the automatic driving operation is implemented in a regular operating mode by means of a main control device and, in an emergency operating mode, by means of an ancillary control device. In the regular driving operation, the main control device continuously determines a regular desired trajectory leading to a predetermined target position in a coordinate system, fixed to the vehicle, of the main control device and carries out the regulation of the movement of the vehicle in accordance with the currently determined regular desired trajectory, i.e., the vehicle is automatically repositioned on the currently determined regular desired trajectory. In the regular operating mode, the main control device furthermore also continuously determines an emergency operation desired trajectory leading to an emergency stop position in the coordinate system of the main control device and the corresponding lane course of a driving lane driven along by the vehicle and supplies this information to the ancillary control device. When, in the regular operating mode, a functional impairment of the main control device is ascertained, the automatic driving operation is switched from the regular operating mode to the emergency operating mode. When a functional impairment emerges, a change of the operating mode from an automatic driving of the vehicle to a standstill takes place along the emergency operation desired trajectory. In the emergency operation mode, the ancillary control device determines the lane course of the driving lane driven along by the vehicle in a coordinate system, fixed to the vehicle, of the ancillary control device. In the emergency operating mode, based on the last lane course determined by the main control device in the regular operating mode and stored in the ancillary control device and based on the lane course determined by the ancillary control device in the emergency operation mode, a potentially present angle error between the alignments of the coordinate system of the main control device and the ancillary control device is determined, and the influence of the angle error on the regulation carried out by the ancillary control device is compensated.

Preferably, in the emergency operating mode, a localization of the vehicle is carried out in order to determine a deviation of the position of the vehicle from the emergency operation desired trajectory. The localization in the transverse direction of the vehicle is here advantageously based on the determination of the distance between the vehicle and at least one lane marking of the driving lane driven along by the vehicle.

Preferably, the localization in the transverse direction of the vehicle takes place on route portions on which there are no lane markings present or on which error detections of the lane markings are to be expected, by means of dead reckoning.

The localization in the longitudinal direction of the vehicle preferably takes place by means of dead reckoning.

The regular desired trajectory determined in the regular operating mode, emergency operation desired trajectory, and the lane course are preferably determined by the main control device based on surrounding information, which obtains the main control device from surroundings sensor system.

Preferably, it is considered as a functional impairment of the main control device if the main control device itself has an error function or the surroundings sensor system, which delivers surroundings information required by the main control device for determining the regular desired trajectory, the emergency operation desired trajectory, and the lane course, has an error function.

Preferably, the emergency stop position, in which the vehicle is to come to a standstill, is continuously determined in the regular operating mode as a position that is on an outermost edge of a driving lane or a road, on a potentially present hard shoulder or on a region next to the road that can be driven along.

Preferably, the emergency operation desired trajectory stored in the ancillary control device is adjusted to altered surrounding conditions in the emergency operating mode by the ancillary control device, provided that the surroundings sensor system or parts thereof are able to function in the emergency operating mode and provide current surroundings information.

Preferably, when switching the automatic driving operation from the regular operating mode to the emergency operating mode, a driver of the vehicle is requested to take on the driving of the vehicle, and the regulation of the movement of the vehicle is ended when the driver takes over the driving of the vehicle, for example by their actuating a pedal or steering wheel or actuating different input means.

A device for carrying out the method according to the invention comprises a main control device, an ancillary control device and surroundings sensor system. The surroundings sensor system is provided for detecting surroundings information, wherein the surroundings information comprises at least information about the lane markings of a driving lane driven along by the vehicle. The main control device is provided for the continuous determination of a regular desired trajectory leading to a predetermined target position, an emergency operation desired trajectory leading to an emergency stop position, and the lane course of the driving lane driven along by the vehicle, wherein the determination is based on the surroundings information detected by the surroundings sensor system. The main control device is set up to take over the vehicle guidance in a regular operating mode of the device and, here, to guide the vehicle in accordance with the detected regular desired trajectory. The determined emergency operation desired trajectory and the determined lane course are forwarded to the ancillary control device and stored there. The ancillary control device is provided for storing the emergency operation desired trajectory determined by the main control device and for determining the lane course of the driven lane driven along by the vehicle based on the surroundings information detected by the surroundings sensor system, and it is set up to take over the vehicle guidance from the main control device if a functional impairment of the main control device emerges and to guide the vehicle in accordance with the stored emergency operation desired trajectory into the emergency stop position. The ancillary control device is furthermore set up to compensate for an angle error between a first coordinate system, which is fixed to the vehicle and is used by the main control device for the vehicle guidance, and a second coordinate system, which is fixed to the vehicle and is used by the ancillary control device for the vehicle guidance. The compensation is preferably based on a comparison between the lane course stored in the ancillary control device, which has been determined by the main control device, and the lane course, determined by the main control device, of the driving lane driven along by the vehicle.

BRIEF DESCRIPTION OF THE DRAWING FIGURES

Exemplary embodiments of the invention are explained in more detail below by means of the drawings.

Here are shown.

Parts corresponding to one another are provided with the same reference numerals in all figures.

DETAILED DESCRIPTION

Figure 1:
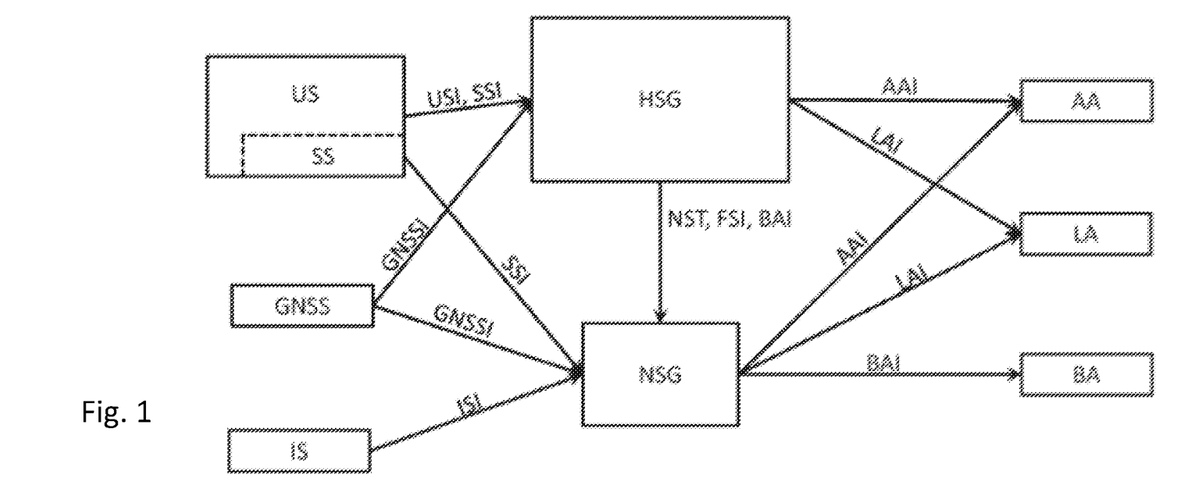
FIG. 1 a block diagram of a device for regulating the longitudinal position of a vehicle, FIG. 2 an example of a typical traffic situation having an emergency operation desired trajectory, FIG. 3 a schematic depiction of one and of lane markings in different coordinate systems.

In a schematic block diagram, FIG. 1 shows a device for regulating the movement of a vehicle in an automatic, in particular highly automatic, driving operation.

The device comprises a main control device HSG, an ancillary control device NSG, surroundings sensor system US having lane sensor technology SS for recognizing driving lane markings of a driving lane currently being driven along by the vehicle, a global navigation satellite system GNSS, inertial sensor technology IS, a drive actuator AA, a steering actuator LA and a braking actuator BA.

The device can be operated in a regular operating mode and in an emergency operating mode. The regular operating mode is the operating mode in which the vehicle is guided in the highly automatic driving operation to a predetermined target position taking the surroundings situation into consideration. The route plan to the target position is carried out by the global navigation satellite system GNSS.

The regular operating mode requires that the automatic driving operation can be implemented safely. When the safe implementation of the automatic driving operation can no longer be guaranteed because of an error function, the operating mode is switched from the regular operating mode to the emergency operating mode, in which the vehicle is automatically guided into an emergency stop position determined in advance.

In the regular operating mode, the main control device receives surroundings information USI from the surroundings sensor system US, in particular information about lane markings SSI and objects protruding into its actual lane or are moved into its driving lane. Based on the surroundings information USI, SSI received, the main control device HSG continuously plans, i.e., in cyclical temporal distances, the movement course of the vehicle F within a predetermined anticipatory horizon. The result of this plan is a desired trajectory, referred to below as a regular desired trajectory, which specifies the path, on which the vehicle is to be guided automatically in the direction of the target position, and which specifies with what speed profile the vehicle is to be moved on this path. Here, the regular desired trajectory is determined in a coordinate system fixed to the vehicle. This coordinate system originates in the vehicle and, as shown in FIG. 2, has a longitudinal coordinate axis x running through the longitudinal axis of the vehicle and a transverse coordinate axis y orthogonal to the longitudinal axis.

Figure 2:
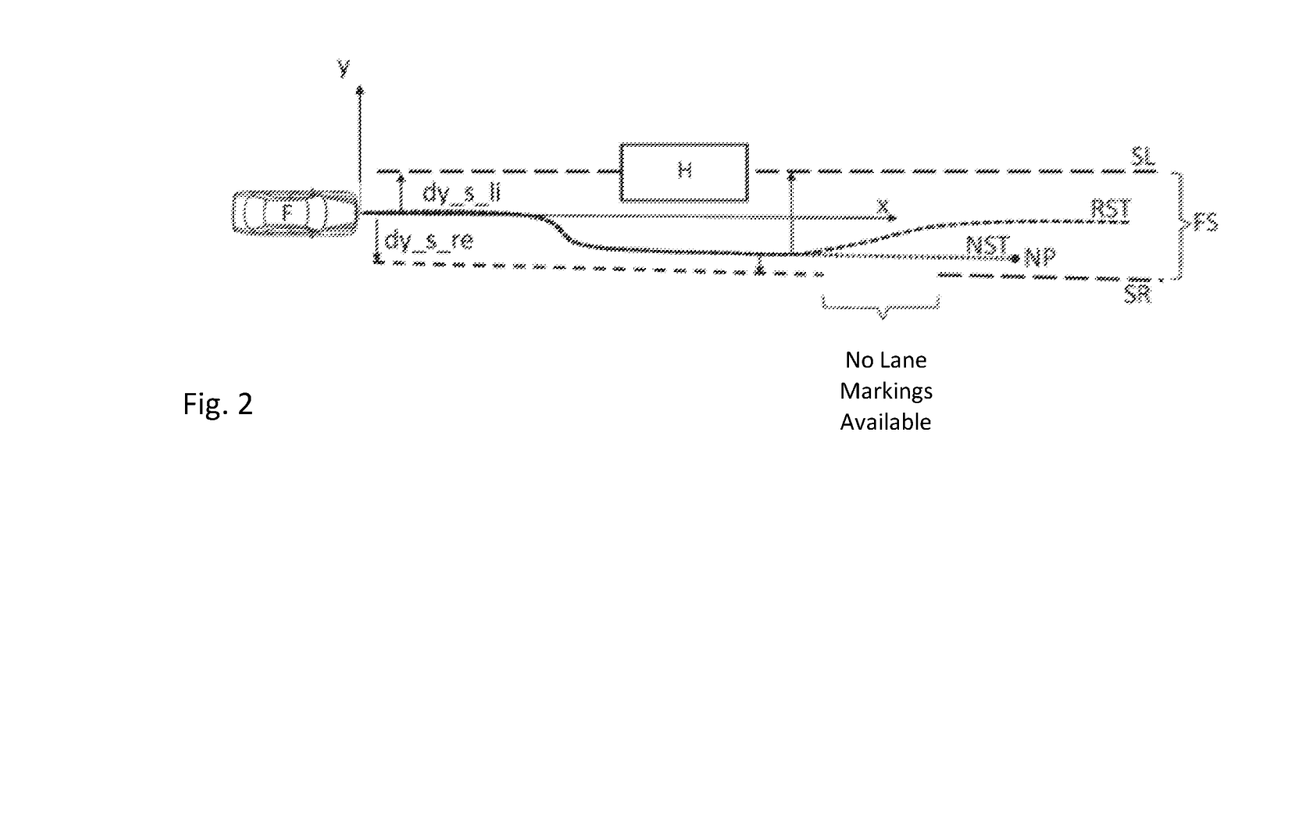

FIG. 2 shows the vehicle F in a typical traffic situation. According to FIG. 2, the vehicle F drives on a driving lane FS, which is bordered by a left lane marking SL and by a right lane marking SR. On the left lane marking SL, there is an obstacle H protruding into the driving lane FS and can be driven around by the vehicle. The regular desired trajectory RST is thus planned in such a way that the obstacle H is driven around. The arrows dy_s_li and dy_s_re mark the distances of the regular desired trajectory RST and the emergency desired trajectory NST to the left or right lane marking SL or SR.

In the regular driving mode, the main control device HSG carries out a trajectory regulation in such a way that the vehicle F is guided according to the requirements of the regular desired trajectory RST. For this, the main control device HSG generates actuating commands AAI, LAI, BAI for the drive actuator AA, steering actuator LA and braking actuator BA acting on the longitudinal and transverse dynamic system of the vehicle F. The drive actuator AA and the steering actuator LA are here controlled directly by the main control device HSG. In contrast, the control of the braking actuator BA is carried out via the ancillary control device NSG, which obtains the corresponding control commands BAI from the main control device HSG.

Furthermore, in the regular driving mode, the main control device HSG continuously, i.e., in cyclical temporal distances, controls an emergency operation desired trajectory in an anticipatory manner in case the automatic driving operation terminated due to an error function of the main control device HSG.

The emergency operation desired trajectory is depicted in FIG. 2 by a dotted curve and is provided with the reference numeral NST. The emergency operation desired trajectory NST is planned in such a way that the obstacle H is avoided, and the vehicle F is held next to the right-hand lane marking SR in a safe emergency stop position NP. The emergency operation desired trajectory NST is determined in the same coordinate system fixed to the vehicle as the regular desired trajectory RST. The emergency operation desired trajectory NST specifies on what path and with what speed profile the vehicle F is to be brought into the safe emergency stop position NP when establishing the error function. An error function of the main control device HSG is present, for example, when the main control device HSG itself is no longer operational or when parts of the surroundings sensor system US, whose signals USI, SSI are imperatively necessary for the safe automatic driving operation, are impaired in terms of their function. The determined emergency operation desired trajectory NST is supplied to the ancillary control device NSG and stored there. Similarly, the driving course FS is detected by the lane sensor technology SS, which is a component of the surroundings sensor system US, by detecting the lane markings SL, SR and information about the detected lane course FSI is supplied to the ancillary control device NSG and stored there.

The ancillary control device NSG is responsible for the implementation of a conventional dynamic driving regulation based on the initial state, detected by the inertial sensor technology IS, of the vehicle F. The inertial sensor technology IS here comprises sensors for determining the driving or wheel speed, the transverse acceleration and the yaw rate of the vehicle F. The ancillary control device NSG coordinates the braking requirements of the main control device HSG, i.e., the actuating commands BAI for the braking actuator BA, with the braking requirements of the driving dynamic regulation. The coordination takes place, in particular, in such a way that the braking requirements of the driving dynamic regulation are operated in advance in comparison to the braking requirements of the main control device HSG.

When it is established in the regular operating mode that an error function of the main control device HSG is present, such that a safe continuation of the automatic driving operation is no longer guaranteed, the operating mode of the device is switched from the regular operating mode into the emergency operating mode. In the emergency operating mode, the ancillary control device NSG takes over the vehicle guidance, i.e., the task of regulating the movement of the vehicle. To do so, the ancillary control device NSH carries out a trajectory regulation in such a way by means of which the vehicle F is guided into the emergency stop position NP according to the. The last valid emergency operation desired trajectory NST is the last emergency operation desired trajectory determined by the main control device HSG before the emergence of the error function and was supplied to the ancillary control device NGS for storage. The emergency stop position NP can be a position, lying ahead, on the actual driving lane, in particular, as shown in FIG. 2, a position on the edge of the driving lane FS. Yet the emergency stop position NP can also be a position on an outermost right or outermost left edge of the road or a position on a hard shoulder present on the edge of the road or a position on a drivable region next to the road.

The ancillary control device NSG, the drive actuator AA, the steering actuator LA and the braking actuator BA are designed redundantly, such that the functionality of the device in the emergency operation mode is also guaranteed in the event of a loss of parts of the device, i.e., it is ensured that the ancillary control device NSG can fulfil its tasks at any time.

The trajectory regulation requires that an actual-desired deviation of the vehicle position is determined and, according to the determined actual-desired deviation, actuating commands AAI, LAI BAI are generated for the drive actuator AA, steering actuator LA and braking actuator BA, which are aligned to a minimization of the actual-desired deviation. The actual-desired deviation is the deviation of the current position of the vehicle, referred to below as the actual position, from the emergency operation desired trajectory NST.

The localization of the vehicle required for the trajectory regulation, i.e., the determination of the actual position, is carried out in the emergency operation mode by dead reckoning and by detecting the driving lane course of the driving lane FS driven along by the vehicle by means of the lane sensor technology SS. Here, the current longitudinal position of the vehicle in the direction of the longitudinal coordinate axis x, i.e., in the longitudinal direction of the vehicle, by means of the dead reckoning based on a previous position of the vehicle F. This means that the movement of the vehicle F is continued by means of odometry or comparable methods, such that it is known where the vehicle F is at any point in time. Here, further parameters, for example the vehicle position, the curvature and curvature change of the vehicle lane etc., can also be taken into consideration. By detecting the lane markings SL, SR, the lateral position of the vehicle relative to the lane markings, i.e., the transverse position of the vehicle in the driving lane FS is determined and, along with it, the transverse position of the vehicle in the direction of the transverse coordinate axis y, i.e., in the transverse direction of the vehicle, is determined.

Here, in general, the term driving lane is understood to mean the continuous existence of a driving lane FS, which is in front of the vehicle on the intended stretch of road lying ahead. With the knowledge of the driving lane FS, one has the advantage that the desired departure of the emergency operation desired trajectory NST does not solely have to take place by means of dead reckoning based on driving-dynamic parameters describing the inertial state of the vehicle, such as acceleration, speed and yaw rate, but also the lane course, detected online, of the vehicle FS can be used to comply with the emergency operation desired trajectory. The lane sensor technology SS used for the lane determination can comprise a camera or a lidar sensor. Possible camera systems are, for example, a camera looking ahead for CMS systems (CMS=Collision Mitigation System) or also cameras for parking assistance systems. The only requirement is that the lane sensor technology SS be operationally available to the ancillary control device NSG in the emergency operating mode.

It is essential for a correct trajectory regulation that the information of the emergency operation desired trajectory NST from the main control device HSG be correctly interpreted by the ancillary control device NSG. This is not readily the case when the emergency operation desired trajectory NST is defined in a coordinate system fixed to the vehicle. The two control devices—the main control device HSG and the ancillary control device NSG—each have an individual coordinate system, which can be defined in the two cases according to DIN 70000, yet which can be rotated relative to each other because of different interpretations and signal processings in the control devices HSG, NSG, i.e., can have different orientations. With longer trajectories, the smallest orientation errors between the coordinate systems lead to great deviations in terms of the desired position. With an angle error of $\alpha=0.5°$ in the longitudinal direction of the vehicle x, the resulting lateral error at a distance of 150 m is already 1.3 m.

Figure 3:
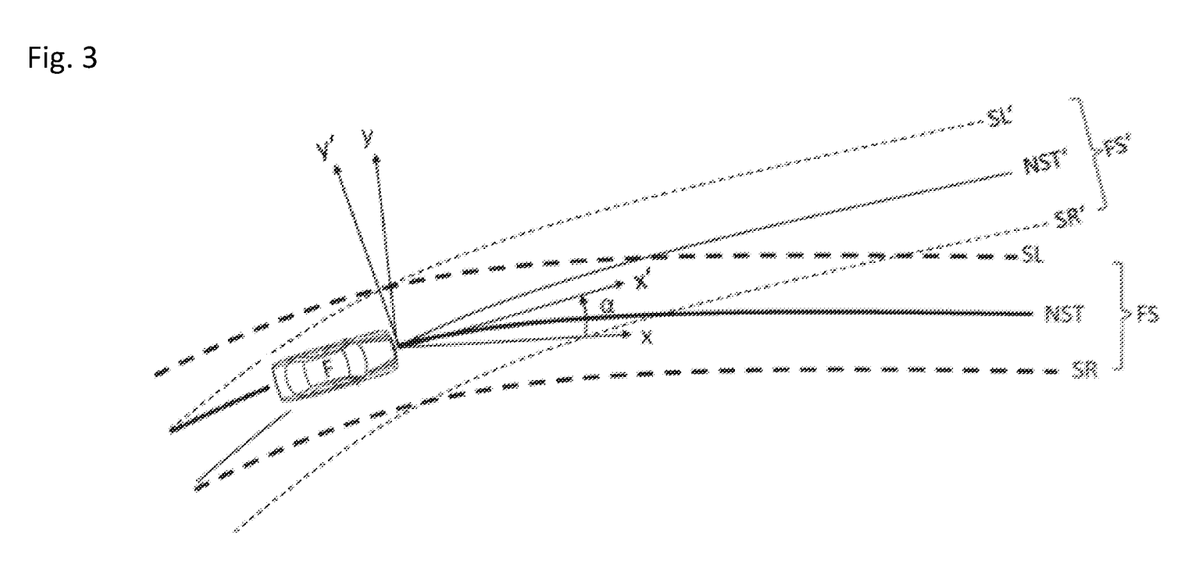

FIG. 3 illustrates this problem. The angle error a is depicted in an exaggerated manner for better illustration. The arrows x and y represent the coordinate axes of a first coordinate system {x, y} fixed to the vehicle, which is used by the main control device HSG for the determination of the courses of the emergency operation desired trajectory NST and the left and right lane marking SL, SR. The arrows x' and y' represent the coordinate axes of a second coordinate system {x', y'} fixed to the vehicle, which is used by the ancillary control device NSH for the trajectory regulation. The two coordinate systems {x, y}, {x', y'} are depicted in an inertial system fixed to the ground at a point in time.

Because of the angle error a between the two coordinate systems {x, y} and {x', y'}, the ancillary control device NGS would see the curve NST' as the desired emergency operation desired trajectory when no measures for compensating for the angle error a are undertaken. The ancillary control device SG would thus guide the vehicle F along the curve NST'. Yet this is not the path which the main control device HSG has determined is the emergency operation desired trajectory NST. In order to compensate for this deviation, in the emergency operating mode, the lane markings are also determined. The curves SL' and SR' represent the course of the lane markings SL' and SR', as they are determined by the ancillary control device NSG in the second coordinate system NST. Since the emergency operation desired trajectory NST determined by the main control device has a defined position relative to the lane markings SL, SR and since this relative position does not change as a result of the rotation of the coordinate system, the lane markings SL', SR' determined in the second coordinate system {x', y'} offer a good reference point for the compensation of the influence resulting from the angle error a. With the mutual and clear understanding of the lane markings, the ancillary control device NSG can store the lane course of the driving lane FS' detected online via the route course and compare it to the lane course, last determined by the main control device HSG, of the driving lane FS. With the aid of statistical methods, e.g., with the method of the smallest error squares, the angle error a can be determined and its influence when regulating the trajectory can be compensated for. This angle error a is advantageously continuously determined and updated.

Provided that the lane sensor technology SS or other parts of the surroundings sensor system US, which are operational in the emergency operation mode, detect an object that is in the path of the emergency operation desired trajectory NST or will enter this, the information about this object is advantageously taken into consideration in order to avoid a collision with the object. The collision avoidance takes place, for example, by a stronger braking of the vehicle, such that the vehicle comes to a standstill before reaching the object by adjusting the emergency operation desired trajectory NST to the new surroundings situation in such a way that the object is avoided.

A further advantage of the invention is that the ancillary control device NSG checks the correctness of the detected driving lane FS, for example by a comparison of the detected driving lane FS to a lane course, which is seen in a highly accurate digital map based on a position of the vehicle determined by means of the global navigation satellite system GNSS. Thus, false lane recognitions can be identified. Thus, the lane marking falsely recognized is not followed but switched to the dead reckoning. The monitoring takes place in such a way that the course of the lane marking detected online is compared to the lane course last determined by the main control device HSG and stored in the ancillary control device and the movement, determined by the dead reckoning, of the vehicle.

If the online lane detection malfunctions because the lane sensor technology SS is defective or degraded, e.g., because of the glare of the sun, it is automatically switched to the regulation with the dead reckoning for the time of the malfunction.

On road portions on which it is known that the lane sensor technology SS is not a real lane marking but rather similar structures such as tar joints or braking lanes, etc., for example, no lane course is delivered at this point for the emergency operation desired trajectory. Thus, the danger that a false lane detection could be followed is precluded. Such points can be made available by driving along and then being stored in a digital map ("map learning" with "cloud service").

If there is partially no lane marking or if the lane marking is only present on one side of the vehicle, this is correspondingly communicated to the ancillary control device NSG. The information about present or missing lane markings is seen on a digital map. By learning maps, it is ensured that this information is up to date. Using this information, the ancillary control device NSG knows on which route portions are not to be regulated onto lane markings determined online and there switched to the dead reckoning. With the dead reckoning, the driving position is derived from the driving dynamic parameters, determined by the inertial sensor technology IS, of the vehicle, in particular from the parameters of acceleration, rotation rate and driving or wheel speed. A further advantage is that, at such points, false lane information that could be generated instead of the missing lane marking, remains unconsidered. If the vehicle returns to a portion having existing lane markings, the regulation to the lane marking detected online is switched over. An integration error existing up until now is removed.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for regulating movement of a vehicle in an automatic driving operation, wherein the automatic driving operation is switchable from a regular operating mode, in which the vehicle is automatically guided to a predetermined target position, to an emergency operating mode, in which the vehicle is automatically guided to an emergency stop position, the method comprising:
   regulating, in the regular operating mode using a main control device, the movement of the vehicle based on a regular desired trajectory leading to the predetermined target position, wherein in the regular operating mode
   the regular desired trajectory is continuously determined by the main control device,
   a lane course, for an emergency operation desired trajectory, of a driving lane is determined and is supplied to an ancillary control device for storage, wherein the driving lane is a lane on which the vehicle is being driven along;
   determining that there is a functional impairment of the main control device;
   switching, while the vehicle is regulated in the regular operating mode, the automatic driving operation from the regular operating mode to the emergency operating mode responsive to the determination of the functional impairment of the main control device;
   regulating, in the emergency operating mode by the ancillary control device, the movement of the vehicle based on the emergency operation desired trajectory stored in the ancillary control device and leading to the emergency stop position,
   wherein the emergency operation desired trajectory is determined by the main control device in the regular operating mode before switching into the emergency operating mode, the emergency operation desired trajectory is supplied to and stored by the ancillary control device,
   wherein the emergency operation desired trajectory and a corresponding lane course are determined in a coordinate system, fixed to the vehicle, of the main control device, and
   wherein, in the emergency operating mode, a deviation between the coordinate system of the main control device and a coordinate system of the ancillary control device is compensated for based on the lane course of the driving lane stored in the ancillary control device and a lane course of the driving lane determined by the ancillary control device.

2. The method of claim 1, further comprising:
   performing, in the emergency operating mode, a localization of the vehicle to determine a deviation of a position of the vehicle from the emergency operation desired trajectory, wherein the localization in a transverse direction of the vehicle is based on a determination of a distance to at least one lane marking of the driving lane driven along by the vehicle.

3. The method of claim 2, wherein the localization in the transverse direction of the vehicle on route portions, on which there are no lane markings or on which error detections of the lane markings are expected, is performed using dead reckoning.

4. The method of claim 2, wherein the localization in the longitudinal direction of the vehicle is performed using dead reckoning.

5. The method of claim 1, wherein, in the regular operating mode, the regular desired trajectory, the emergency operation desired trajectory and the corresponding lane course of the driving lane driven along by the vehicle are determined by the main control device based on surroundings information obtained from a surroundings sensor system.

6. The method of claim 5, wherein a functional impairment of the main control device is present when the main control device itself has an error or when the surroundings sensor system, which delivers the surroundings information necessary for the main control device, has an error.

7. The method of claim 1, wherein the emergency stop position in the regular operating mode is continuously determined as a position which is at an outermost edge of a driving lane or a driving lane or a road, on a potentially present hard shoulder, or on a region that can be driven along next to the road.

8. The method of claim 1, wherein in the emergency operating mode, the stored emergency operation desired trajectory is adjusted by the ancillary control device to amended surroundings conditions when current surroundings information is available.

9. The method of claim 1, wherein when switching the operating mode into the emergency operating mode, a driver of the vehicle is required to take over vehicle guidance, and the regulation of the movement of the vehicle is terminated when the driver takes over the vehicle guidance.

10. A device for guiding a vehicle, the device comprising:
   a surroundings sensor system configured to detect detecting surroundings information;
   a main control device configured to provide a continuous determination of a regular desired trajectory leading to a predetermined target position, an emergency operation desired trajectory leading to an emergency stop position, and a lane course of a driving lane based on the detected surroundings information, wherein the driving lane is a lane on which the vehicle is being driven along, and wherein the main control device is configured to take over regulation of movement of the vehicle in a regular driving mode of the device and to guide the vehicle according to the determined regular desired trajectory; and an ancillary control device configured to store the emergency operation desired trajectory and the lane course determined by the main control device in order to determine the lane course of the driving lane driven along by the vehicle based on the surroundings information detected by the surroundings sensor system, wherein the ancillary control device is configured to take over regulation of the movement of the vehicle when a functional impairment of the main control device occurs and to guide the vehicle in accordance with the emergency operation desired trajectory, and wherein the ancillary control device is further configured to compensate for an angle error between a first coordinate system, fixed to the vehicle, which is used by the main control device for the regulation of the movement of the vehicle, and a second coordinate system, fixed to the vehicle, which is used by the ancillary control device for the regulation of the movement of the vehicle.

* * * * *